April 23, 1929.  A. O. AUSTIN  1,709,825

CONNECTER FITTING FOR INSULATORS

Filed May 27, 1927

INVENTOR
Arthur O. Austin
BY Nissen & Crane
ATTORNEYS

Patented Apr. 23, 1929.

1,709,825

UNITED STATES PATENT OFFICE.

ARTHUR O. AUSTIN, OF NEAR BARBERTON, OHIO, ASSIGNOR, BY MESNE ASSIGN-
MENTS, TO THE OHIO BRASS COMPANY, OF MANSFIELD, OHIO, A CORPORATION OF
NEW JERSEY.

CONNECTER FITTING FOR INSULATORS.

Application filed May 27, 1927. Serial No. 194,605.

This invention relates to electrical insulators and especially to insulators for relatively high voltages where a number of insulators are connected to form a rigid series. One object of the invention is to provide means for rigidly connecting insulators in series which will be economical to manufacture, efficient in operation, of improved construction and which will permit ready adjustment of the separate insulators in the series about the axis thereof. Other objects and advantages will appear from the following description and claims.

The invention is exemplified in the combination and arrangement of parts shown in the accompanying drawing and described in the following specification, and it is more particularly pointed out in the appended claims.

Rigid insulators have many uses such as holding bus bars, steady strains, and for compression members. Where the various insulator shells are cemented together so as to form a complete unit, the breakage of a part usually necessitates the loss of the entire insulator. The difficulties of manufacture and in shipping the large insulator, are also serious. Insulator shells which are provided with metal parts arranged to be screwed or bolted together, are rather costly to manufacture or assemble and may also reduce the effective clearance of the insulator.

In the improved type of insulator, many of these disadvantages are reduced or eliminated, with the result that a cheap and efficient insulator of rigid type made up of separable units is readily produced.

Figure 1:
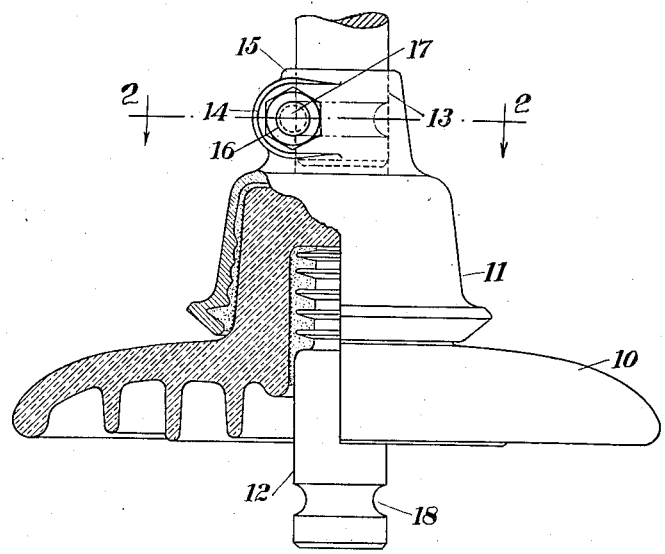
Fig. 1 is an elevation with parts in section showing one embodiment of the invention.
Figure 2:
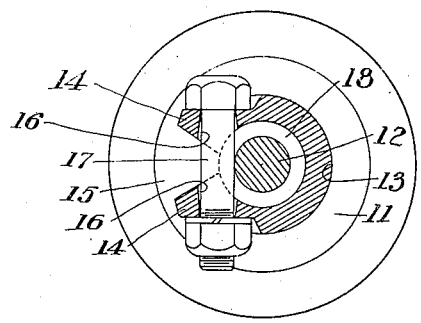
Fig. 2 is a section on line 2—2 of Fig. 1.

Fig. 1 shows one form of the improved insulator in which an insulating member 10 is provided with a metal cap 11 which is cemented to it in the usual way. The porcelain part has a recess into which a suitable metal pin 12 is cemented. The cap 11 has a cylindrical recess 13 into which the projecting end of the pin 12 fits. The cylindrical portion of the cap 13 is provided with bosses 14 each side of a slot 15. The bosses are provided with holes 16 of suitable size for a bolt 17. The pin 12 is provided with a groove 18. This groove registers with the hole 16 running through the cap so that when the bolt 17 is in position, the body of the bolt engages in the groove in the pin, 18, preventing its withdrawal. While the pin will be locked in place with a rivet or pin thrust through the hole 16 and engaging the groove 18, there will be a certain amount of play or looseness, as it is practically impossible to maintain very close fits with metal parts which are galvanized, as is generally the practice with insulator fittings. By making the collar 13 such that it can be drawn in by the bolt 17, it is possible to eliminate any looseness and couple successive units or members together rigidly. This insures proper alignment, and when the insulators are once in position, they will be locked not only longitudinally but for any torsional movement. At the same time, the connection permits of the rotation of the insulators for assembly or inspection, or for changing the path of drip water without disconnecting from the terminal fittings. For severe conditions where the insulators operate with the axis in a nearly horizontal position, drip water running over the lower portion of the insulating element may deposit dirt and conducting material, building up a path of greatly lowered resistance. Where the insulated unit may be rotated, however, this portion may be thrown up after a period of time and a fresh surface provided which will tend to reestablish the high resistance. The portion which has become more or less coated and which is now in the upper postion, will tend to be cleaned or, at least, will accumulate little or no further dirt. The arrangement makes it possible to form the pin in a turret or automatic screw machine, which is a decided advantage as a pin of great uniformity, high strength and small size may be produced. The socket in the cap which engages the pin is easily formed, and if formed or trued up, it consists in a simple cylindrical opening. Since a bearing surface is produced in the pin below the groove and one above, the reduction in the cross-section to provide the locking groove does not necessarily weaken the pin appreciably, as the bending moment is greatest at the point of entry into the socket in the cap running to zero at the end. The locking groove also permits placing the locking bolt nearer the axis of the insulator so that it does not project and reduce the clearance as in most separable combinations. The locking bolt may be in the form of a cap screw, or may be run entirely through the socket, as desired. It is important, however, that it be capable of clamping the two portions against the pin tightly. This type of construction makes it possible to provide the insulator with a resilient type of pin at a comparatively low cost. In attaching to the end members, all that is necessary is to provide complementary members similar to the cap and pin. Since the construction is such that the insulator may be rotated to any position, it is not necessary to provide for angular alignment about the axis, thus greatly simplifying assembly.

I claim:

1. An insulator having a socket at one side thereof and a pin at the opposite side thereof, said pin being provided with a circumferential groove and a transverse locking member connected with said socket to engage the circumferential groove in the pin of a connected insulator.

2. An insulator having a cap secured to one side thereof and a pin secured to the opposite side of said insulator and projecting therefrom in axial alignment with said cap, said pin having a circumferential groove in the projecting portion thereof, and said cap having a socket for receiving the pin of a connected insulator and a transverse locking member carried by said cap and projecting into said socket in position to engage the groove in the pin of a connected insulator.

3. An insulator comprising a dielectric member, a cap secured to one side of said dielectric member, a pin secured to said dielectric member and projecting from the side thereof opposite said cap, said pin having a circumferential groove in the projecting portion thereof spaced backwardly from the end of said pin, said cap having a socket therein for receiving the pin of a connected insulator, said socket being slit at one side and a threaded member arranged transversely of said socket and crossing the slit therein in position to engage the circumferential groove in the pin of a connected insulator and to clamp said socket tightly about said pin.

4. An insulator comprising a dielectric member, a metallic fitting secured to said member at one side thereof, a pin having a resilient connection with said member and projecting from the side of said dielectric member opposite said fitting, said pin having a circumferential groove therein, spaced backwardly from the end of said pin, said fitting having a socket therein in axial alignment with said pin, the side-wall of said socket being slitted, a threaded locking key extending across the slit in said side-wall and projecting into said socket in position to engage the circumferential groove in the pin of a connected insulator disposed in said socket and arranged to clamp the wall of said socket against said pin at both sides of said groove to rigidly lock said pin and fitting to each other.

5. An insulator comprising a dielectric member, a cap secured to one side of said member having a cylindrical socket therein at the side of said dielectric member, a pin secured to said dielectric member at the side thereof opposite said cap, said pin having a cylindrical portion projecting from said dielectric member of a size and shape to fit the cylindrical socket of a connected insulator, said pin having a circumferential groove therein spaced backwardly from the projecting end thereof, the wall of said socket being slitted at one side, and a threaded locking bar extending across the slitted portion of said socket and projecting into said socket in position to engage the circumferential groove of a pin extending into said socket.

In testimony whereof I have signed my name to this specification on this 21st day of May, A. D. 1927.

ARTHUR O. AUSTIN.